(12) United States Patent
Zhang et al.

(10) Patent No.: US 11,110,892 B2
(45) Date of Patent: Sep. 7, 2021

(54) METHOD OF BICYCLE PARKING MANAGEMENT AND A SYSTEM OF BICYCLE PARKING MANAGEMENT

(71) Applicant: Neutron Holdings, Inc., San Francisco, CA (US)

(72) Inventors: Xi Zhang, Shengzhen (CN); Wei Feng, Shengzhen (CN); Xiaotao Xiao, Shengzhen (CN); Yang Song, Shengzhen (CN)

(73) Assignee: NEUTRON HOLDINGS, INC., San Francisco, CA (US)

( * ) Notice: Subject to any disclaimer, the term of this patent is extended or adjusted under 35 U.S.C. 154(b) by 0 days.

(21) Appl. No.: 16/878,334

(22) Filed: May 19, 2020

(65) Prior Publication Data

US 2020/0276958 A1    Sep. 3, 2020

Related U.S. Application Data

(63) Continuation of application No. PCT/CN2018/116801, filed on Nov. 21, 2018.

(30) Foreign Application Priority Data

Nov. 21, 2017  (CN) .......................... 201711167135.7
Nov. 21, 2017  (CN) .......................... 201721563916.3

(51) Int. Cl.
  *G05B 19/00*   (2006.01)
  *B60R 25/24*   (2013.01)
  (Continued)

(52) U.S. Cl.
  CPC ............... *B60R 25/24* (2013.01); *B62H 5/00* (2013.01); *H04L 67/10* (2013.01); *H04L 67/125* (2013.01);
  (Continued)

(58) Field of Classification Search
  CPC .......... B60R 25/24; B62H 5/00; H04L 67/10; H04L 67/125; G06Q 30/0645; G06Q 50/30; G06Q 2240/00
  (Continued)

(56) References Cited

U.S. PATENT DOCUMENTS 8,432,270 B2 * 4/2013 Lee .................... G01C 21/3697
                                                      340/436
10,093,379 B2 * 10/2018 Hines .................... B62J 11/00
(Continued)

FOREIGN PATENT DOCUMENTS

CN     205116991 U      3/2016
CN     106097590 A     11/2016
(Continued)

*Primary Examiner* — Zhen Y Wu
(74) *Attorney, Agent, or Firm* — Dentons US LLP

(57) ABSTRACT

A bicycle parking management method and system which receives, by a user terminal, a temporary parking instruction triggered by a user; sends, by the user terminal, the temporary parking instruction to a cloud management platform; sends, by the cloud management platform, a first temporary locking instruction to a bicycle terminal after receiving the temporary parking instruction sent by the user terminal; and locks, by the bicycle terminal, a locking device on the bicycle, after receiving the first temporary locking instruction sent by the cloud management platform. The solution provided by the present disclosure does not require the user to manually lock the bicycle, thus improving the user's experience, and also providing a new solution for managing the parking of the bicycle.

17 Claims, 7 Drawing Sheets

(51) Int. Cl.
*B62H 5/00* (2006.01)
*H04L 29/08* (2006.01)
*G06Q 30/06* (2012.01)
*G06Q 50/30* (2012.01)

(52) U.S. Cl.
CPC ......... *G06Q 30/0645* (2013.01); *G06Q 50/30* (2013.01); *G06Q 2240/00* (2013.01)

(58) Field of Classification Search
USPC ....................................................... 340/5.61
See application file for complete search history.

(56) References Cited

U.S. PATENT DOCUMENTS

| | | | | |
|---|---|---|---|---|
| 10,183,713 | B1 * | 1/2019 | Mohamed | B62K 19/40 |
| 10,223,854 | B2 * | 3/2019 | Hu | B60R 25/24 |
| 10,501,051 | B2 * | 12/2019 | Takatsuka | G08C 17/00 |
| 10,641,014 | B2 * | 5/2020 | Tepper | G07C 9/33 |
| 2002/0083746 | A1 * | 7/2002 | Cleveland | G07C 9/00182 |
| | | | | 70/233 |
| 2004/0119583 | A1 * | 6/2004 | Linden | B62J 3/00 |
| | | | | 340/432 |
| 2008/0290999 | A1 * | 11/2008 | Chen | B62J 6/16 |
| | | | | 340/432 |
| 2010/0228405 | A1 | 9/2010 | Morgal et al. | |
| 2010/0313614 | A1 * | 12/2010 | Rzepecki | B62H 5/145 |
| | | | | 70/233 |
| 2011/0307394 | A1 * | 12/2011 | Rzepecki | G06Q 30/0645 |
| | | | | 705/307 |
| 2014/0265237 | A1 | 9/2014 | Strother et al. | |
| 2015/0330109 | A1 | 11/2015 | Tepper et al. | |
| 2017/0009491 | A1 * | 1/2017 | Nguyen | G07C 9/00944 |
| 2017/0106866 | A1 * | 4/2017 | Schieffelin | B62J 99/00 |
| 2017/0364995 | A1 * | 12/2017 | Yan | B62H 3/00 |
| 2018/0297557 | A1 * | 10/2018 | Jin | B60L 50/20 |
| 2018/0322603 | A1 * | 11/2018 | Hu | G06Q 50/30 |
| 2018/0322721 | A1 * | 11/2018 | Hu | B60R 25/24 |
| 2018/0370485 | A1 * | 12/2018 | Takatsuka | B60R 25/32 |
| 2019/0193678 | A1 * | 6/2019 | Leiber | G06Q 10/02 |
| 2019/0248439 | A1 * | 8/2019 | Wang | B60L 53/80 |
| 2020/0236523 | A1 * | 7/2020 | Zhang | H04W 68/005 |

FOREIGN PATENT DOCUMENTS

| | | |
|---|---|---|
| CN | 106447467 A | 2/2017 |
| CN | 206351676 U | 7/2017 |
| CN | 107705116 A | 2/2018 |
| CN | 107767239 A | 3/2018 |
| EP | 2315192 A1 | 4/2011 |
| KR | 10-2010-0038524 A | 4/2010 |

* cited by examiner

METHOD OF BICYCLE PARKING MANAGEMENT AND A SYSTEM OF BICYCLE PARKING MANAGEMENT

CROSS REFERENCE TO RELATED APPLICATIONS

This application claims the priorities of Chinese patent application no. 201711167135.7, filed Nov. 21, 2017, Chinese patent application no. 201721563916.3, filed Nov. 21, 2017, and PCT application no. PCT/CN2018/116801, filed Nov. 21, 2018. The contents of the above applications are incorporated herein by reference.

TECHNICAL FIELD

The present disclosure relates to the field of communication technology, and particularly to a method of bicycle parking management and a system of bicycle parking management.

BACKGROUND

In the field of leasing of shared bicycles, various types of shared bicycles are becoming more and more common and have become an important part of urban transportation. Among them, the prevalence of pileless bicycles has brought great convenience to users' riding.

However, when the user needs to temporarily park the bicycle to handle other things, he usually needs to lock the bicycle first, and then unlock it after he returns. This method will cause two disadvantages: 1) if the user temporarily leaves the bicycle unlocked it is likely that other users will ride away with the bicycle; and 2) excessively resetting locked and unlocking the bicycle greatly reduces the user experience.

SUMMARY

Embodiments of the present disclosure provide a method and system for bicycle parking management to improve user experience.

To achieve the purpose of the present disclosure, the embodiments of the present disclosure adopt the following technical solutions:

In one aspect, an embodiment of the present disclosure provides a bicycle parking management method, which includes:

receiving, by a user terminal, a temporary parking instruction triggered by a user; sending, by the user terminal, the temporary parking instruction to a cloud management platform; sending, by the cloud management platform, a first temporary locking instruction to a bicycle terminal after receiving the temporary parking instruction sent by the user terminal; and locking, by the bicycle terminal, a locking device on the bicycle, after receiving the first temporary locking instruction sent by the cloud management platform.

In another aspect, an embodiment of the present disclosure provides a bicycle parking management system, which includes: a user terminal, a bicycle terminal and a cloud management platform, wherein: the user terminal comprises an input unit and a first long-distance communication unit, wherein: the input unit is configured to receive a temporary parking instruction triggered by a user; and the first long-distance communication unit is configured to send the temporary parking instruction to the cloud management platform when the input unit receiving the temporary parking instruction; the cloud management platform is configured to send a first temporary parking instruction to a bicycle terminal after receiving the temporary parking instruction sent by the user terminal; the bicycle terminal comprises a vehicle lock control unit, a second long-distance communication unit, a main control unit, and a locking device, wherein: the second long-distance communication unit is configured to receive the first temporary parking sent by the cloud management platform; the main control unit is configured to control to send the first temporary locking instruction received by the second long-distance communication unit to the device lock control unit; and the device lock control unit is configured to lock the locking device on a bicycle according to the first temporary locking instruction.

In another aspect, an embodiment of the present disclosure provides a method for managing locking of a bicycle, which includes: performing locking a bicycle when receiving a locking request to the bicycle sent by a user of the bicycle; and performing unlocking the bicycle when receiving an unlocking request sent by the user of the bicycle; wherein the locking the bicycle and the unlocking the bicycle are achieved by a locking mechanism of the bicycle, and wherein the locking the bicycle and the unlocking the bicycle do not require manual operation of the locking mechanism by the user.

In another aspect, an embodiment of the present disclosure provides a system for managing locking of a bicycle, which includes: a bicycle, configured with a locking mechanism, is configured to lock the bicycle and unlock the bicycle; and a server, is configured to: (1) receive a locking request from a user of the bicycle; (2) send a locking instruction to the bicycle to lock the bicycle; (3) receive an unlocking request from the user of the bicycle, and (4) send an unlocking instruction to the bicycle to perform unlock the vehicle; and wherein the locking the bicycle and unlocking the bicycle do not require manual operation of the locking mechanism by the user.

In another aspect, an embodiment of the present disclosure provides a bicycle, which includes: a locking mechanism, configured to lock the bicycle and unlock the bicycle; and a controller, configured to: (1) receive a locking request; (2) control the locking mechanism to lock the bicycle, upon receiving the locking instruction; (3) receive an unlocking instruction; and, (4) control the locking mechanism to unlock the bicycle, upon receiving the unlocking instruction; and wherein the locking the bicycle and unlocking the bicycle do not require manual operation of the locking mechanism by a user.

In summary, according to the method and system for bicycle parking management provided by embodiments of the present disclosure, when a user needs temporary parking, a temporary parking instruction is sent to a cloud management platform through a user terminal, and the cloud management platform controls the bicycle terminal to lock the lock device on the bicycle That the device does not need to be manually locked improves the user experience, and also provides a new solution for managing bicycle parking.

DETAILED DESCRIPTION

The disclosure is further described in detail below with reference to the drawings and embodiments. It can be understood that the specific embodiments described herein are only used to explain the present disclosure, but not to limit the present disclosure. It should also be noted that, for convenience of description, only some parts related to the present disclosure are shown in the figures instead of all the structures.

Embodiment 1

Figure 1:
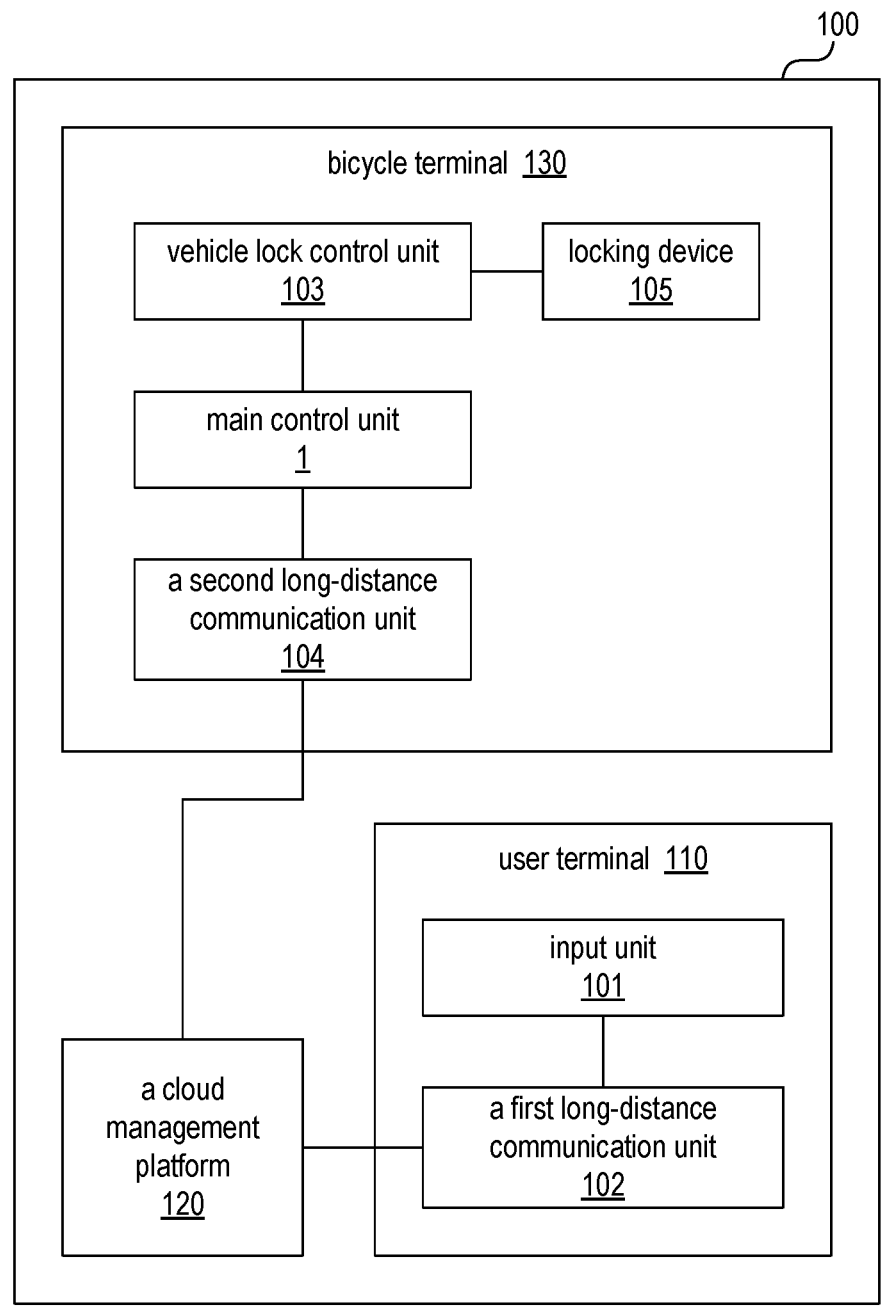
FIG. 1 shows a structural block diagram of a bicycle parking management system disclosed in the first embodiment of the present disclosure.

FIG. 1 is a schematic structural diagram of a bicycle parking management system provided by Embodiment 1 of the present disclosure. The system can be used when a user needs to park temporarily to handle other things while riding a bicycle. The user needs to lock the bicycle and needs to unlock the bicycle when the user comes back. The bicycle is a kind of public rental equipment for users to rent. It can be a pileless bicycle, a pileless electric vehicle, etc. Actually, the system 100 may include a user terminal 110, a cloud management platform 120, and a bicycle terminal 130. The bicycle terminal 130 is configured to be installed on a bicycle.

The user terminal 110 includes an input unit 101 and a first long-distance communication unit 102. The input unit 101 is configured to receive a temporary parking instruction triggered by a user, and the first long-distance communication unit 102 is configured to, when the input unit receives a temporary parking instruction, send a temporary parking instruction to the cloud management platform 120.

The cloud management platform 120 is configured to send a first temporary locking instruction to the bicycle terminal 130 after receiving a temporary parking instruction sent by the user terminal 110.

The bicycle terminal 130 includes a vehicle lock control unit 103, a second long-distance communication unit 104, a main control unit 1, and a locking device 105. The second long-distance communication unit 104 is configured to receive a first temporary locking instruction sent by the cloud management platform 120. The main control unit 1 is configured to control to send the first temporary locking instruction received by the second long-distance communication unit 104 to the vehicle lock control unit 103. The vehicle lock control unit 103 is configured to lock the locking device 105 on the bicycle according to the first temporary locking instruction, wherein the locking device 105 is a hub lock or a brake lock.

The user terminal 110 is a device used by a user to perform operations such as unlocking a rental bicycle and temporarily parking. The user terminal 110 may be a mobile terminal such as a mobile phone. The cloud management platform 120 may be a processing server, a service terminal or a server that handles integrated services. The service terminal is configured to provide decisions for unlocking the bicycles and temporary parking, etc., or provide decisions for events such as alarms, provide strategies for the deployment of bicycles, manage the geographical location information of bicycles, and perform charging data management on a user's ride.

The locking device 105 is a device for the user to lock and unlock the bicycle on the bicycle. The lock device 105 may be a hub lock, a faucet lock, or a brake lock. A brake lock refers to a lock that can stop the bicycle from moving forward after receiving a lock command. Preferably, the locking device 105 is a hub lock.

Bicycles are generally equipped with locks, which requires users to request operations such as unlocking and parking. The user terminal 110 includes an input unit 101 and a first long-distance communication unit 102. The input unit 101 may be a button on the user terminal 110, such as a virtual touch screen button, a physical button or a knob, or a scanning frame which includes a dimensional code scanning frame or a barcode scanning frame. Preferably, the input unit 101 may include a temporary parking button for receiving a temporary parking instruction input by the user. The temporary parking instruction is a level signal or a pulse signal generated when the user triggers the temporary parking button on the user terminal 110. The instruction may include an identification of the bicycle and an identification of the user terminal 110. Bicycle identification refers to the unique sign used to identify the bicycle, such as a sign of a bicycle without piles. Each bicycle has a unique vehicle number. The vehicle number can be an ID number on the bicycle, such as a string of numbers, letters, or a combination of the numbers and the letters. The identification of the user terminal 110 may be a phone number of the user terminal 110. The first long-distance communication unit 102 may use a SIM card on a user terminal, and may connect to a mobile communication network such as 3G/4G, GPRS, etc., via the SIM card to implement remote communication.

The specific operation process is as follows. When the user terminal 110 receives the temporary parking instruction generated by the user triggering the temporary parking button on the user terminal 110, the first long-distance communication unit 102 in the user terminal 110 sends the temporary parking instruction to the cloud management platform 120 based on the long-distance communication protocol. After receiving the temporary parking instruction, the cloud Management Platform 120 will process the temporary parking instruction. The processing of the temporary parking instruction may be implemented in software or hardware circuits, such as converting the temporary parking instruction to a level signal and pulse signal, which represents the first temporary parking instruction, through a level conversion. Specifically, the first temporary locking instruction refers to a signal generated by the cloud management platform 120 according to the phone number of the user terminal 110 and the ID of the bicycle when the user needs to temporarily park the vehicle, and the cloud management platform 120 receives the temporary parking instruction sent by the user terminal 110. Exemplarily, the first temporary lock instruction may include the ID of the bicycle and the like. The long-distance communication protocol may be Ethernet, GPRS (General Packet Radio Service, packet wireless service), and the like.

Preferably, after receiving the temporary parking instruction sent by the user terminal 110, the cloud management platform 120 may also send a first temporary locking instruction to the bicycle terminal 130, and monitor the locking situation of the bicycle in real time. The bicycle terminal 130 includes a second long-distance communication unit 104 that can be used to receive the first temporary locking instruction sent by the cloud management platform 120. After the first temporary locking instruction received by the second long-distance communication unit 104, the main control unit 1 of the bicycle terminal 130 will send the first temporary locking instruction to the vehicle lock control unit 103. The car lock control unit 103 will generate a corresponding signal to control the lock on the bicycle. The locking device 105 locks the bicycle or unlocks the bicycle, according to the corresponding signal. The second long-distance communication unit 104 may be the same as the first long-distance communication unit. The main control unit 1 may be a hardware circuit such as a single-chip microcomputer integrated with various chips and configured to control each unit of the bicycle terminal 130, such as the second long-distance communication unit 104 and vehicle lock control unit 103, etc. The vehicle lock control unit 103 can be implemented by hardware circuits, such as level signals or pulse signals generated by a circuit composed of switches to control the locking device 105 on the bicycle to lock or unlock the bicycle.

An embodiment of the present disclosure provides a bicycle parking management system. When a user needs temporary parking, a temporary parking instruction is sent to the cloud management platform through a user terminal, and the bicycle management terminal controls the bicycle terminal to lock the locking device on the bicycle. No manual locking is needed, thus improving the user experience, and providing a new solution for managing bicycle parking.

Furthermore, when the user needs to continue using the locked bicycle, the above system may further include the following.

The input unit 101 of the user terminal 110 is further configured to receive a keeping riding instruction triggered by the user. The first long-distance communication unit 102 is further configured to send the keeping riding instruction to the cloud management platform 120 after the input unit 101 receives the keeping riding instruction.

The management platform 120 is further configured to send a first unlocking instruction to the bicycle terminal 130 after receiving the keeping riding instruction sent by the user terminal 110.

The second long-distance communication unit 104 of the bicycle terminal 130 is further configured to receive the first unlocking instruction sent by the cloud management platform 120, and the main control unit 1 is configured to control the first unlocking instruction received by the second long-distance communication unit 104 to be sent to the vehicle lock control unit 103. The vehicle lock control unit 103 is configured to unlock the locking device 105 on the bicycle according to the first unlocking instruction.

The input unit 101 of the user terminal 110 may further include a keeping riding button. Similarly, the keeping riding button may be a virtual touch screen button or a physical button. The keeping riding button and the temporary parking button may be the same physical button or different physical buttons. When the user triggers the keeping riding button on the user terminal 110, a keeping riding instruction will be generated. The keeping riding instruction is similar to the temporary parking instruction, wherein the keeping riding instruction may be a level signal or a pulse signal generated when the user triggers the keeping riding button on the user terminal 110. The keeping riding instruction may include the identification of the bicycle and the identification of the user terminal 110, etc. Preferably, the identification of the bicycle is a bicycle ID, and the identification of the user terminal 110 is a telephone number of the user.

The first unlock instruction corresponds to the first temporary locking instruction. When the user needs to continue riding the bicycle, the cloud management platform 120 may use the software method or the hardware circuit, for example, the keeping riding instruction is converted into a level signal or a pulse signal representing the first unlock instruction through level conversion, after receiving the keeping riding instruction sent by the user terminal 110. The specific level may be the level generated by the switch circuit according to the phone number of the user terminal 110 and the ID of the bicycle.

Specifically, when the input unit 101 of the user terminal 110 receives the keeping riding instruction generated by user triggering the keeping riding button on the user terminal 110, the first long-distance communication unit 102 of the user terminal 110 sends the keeping riding instruction to the cloud management platform 120 based on the long-distance communication protocol. After the cloud management platform 120 receives the keeping riding instruction sent by the user terminal 110, the cloud management platform 120 firstly compares the phone number of the user terminal 110 and the bicycle ID carried in the keeping riding instruction with the phone number of the terminal 110 and the ID of the bicycle the user stored in advance in the database of the bicycle management system, and determines whether the received keeping riding instruction is triggered by the user who initiates a temporary parking instruction. If the keeping riding instruction is triggered by the user who initiated the temporary parking instruction, the cloud management platform 120 will send a first unlock instruction to the second long-distance communication unit 104 of the bicycle terminal 130, and the second long-distance communication unit 104 receives the first unlock command. The main control unit 1 of the bicycle terminal 130 controls the first unlock instruction received by the second long-distance communication unit 104 to be sent to the vehicle lock control unit 103 of the bicycle terminal 130. The vehicle lock control unit 103 generates a signal for unlocking the bicycle, such as a level signal. The signal is configured to control the locking device 105 to unlock the bicycle.

An embodiment of the present disclosure provides a bicycle parking management system. When a user needs to continue riding a bicycle, a user terminal sends keeping riding instruction to the cloud management platform through the user terminal, and the cloud management platform controls the bicycle terminal to unlock the locking device on the bicycle. There is no need to manually unlock, thus improving the user experience, and also providing a new solution for managing bicycle parking.

Figure 2:
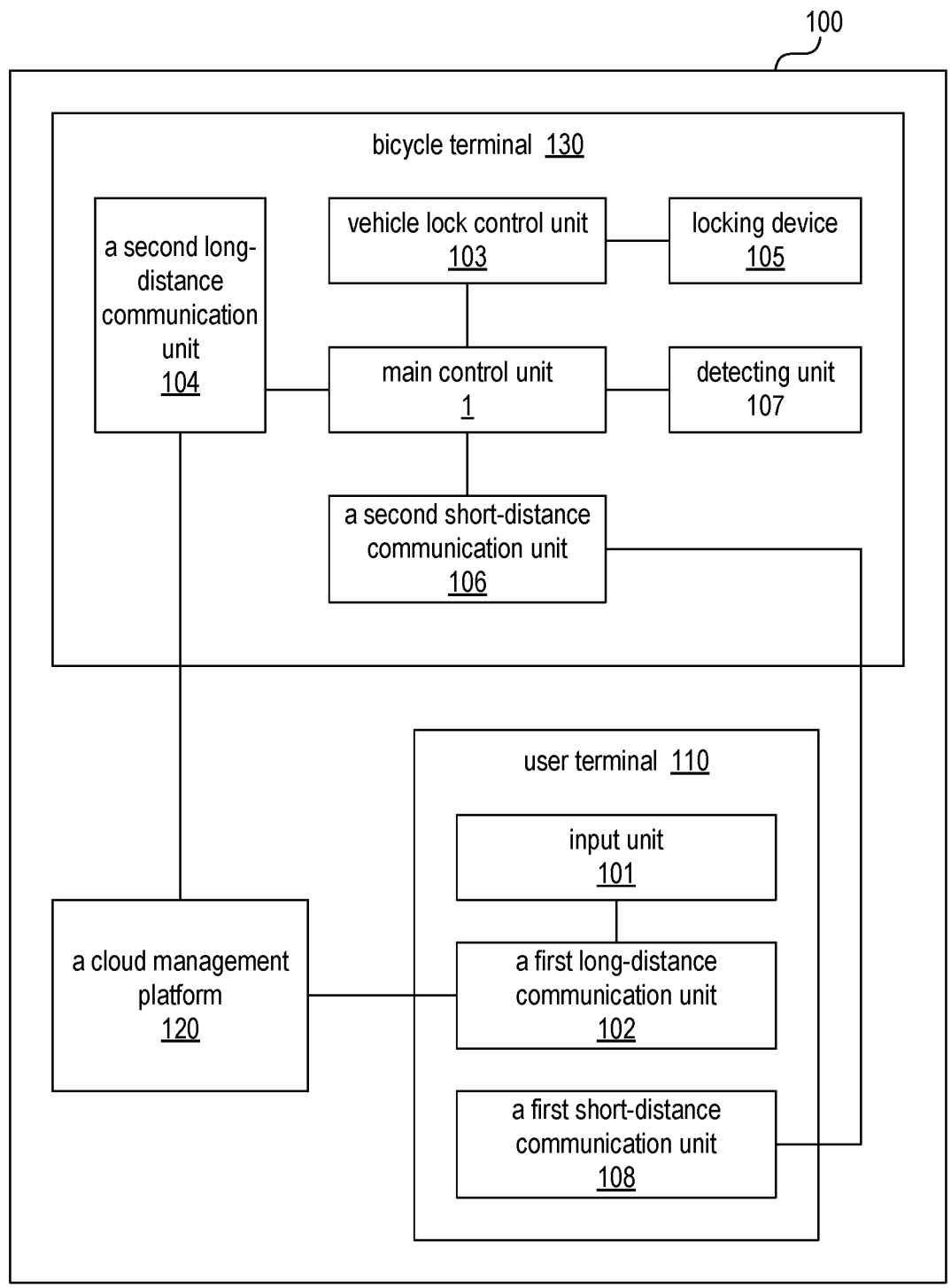
FIG. 2 shows a structural block diagram of a bicycle parking management system disclosed in the first embodiment of the present disclosure.

Furthermore, based on the above embodiments, the user's temporary parking situation may be further optimized. Specifically, as shown in FIG. 2, the above system may further include the following.

The second short-distance communication unit 106 of the bicycle terminal 130 is further configured to, before responding to the first temporary locking instruction, establish a communication connection with the user terminal 110 based on the short-range wireless communication protocol and store the identification information of the user terminal 110. The second short-distance communication unit 106 is configured to verify the identification information of the user terminal 110 in the first unlocking instruction before responding to the first unlocking instruction.

The second short-distance communication unit 106 may be any one of a WIFI (Wireless Fidelity) unit, a ZIGBEE unit, or a BT (blue tooth) unit. The identification information of the user terminal 110 is an identification of the communication method used by the user terminal, such as a Bluetooth identification, when the second short-distance communication module 104 of the bicycle terminal 130 establishes a communication connection with the user terminal 110 based on the short-range wireless communication protocol. Specifically, when the user terminal 110 establishes the communication connection with the bicycle terminal 130 through Bluetooth, the bicycle terminal 130 stores the Bluetooth identification information of the user contained in the form of a level signal. Different users have different Bluetooth identities, so the corresponding signals are different. The specific temporary parking process is the same as above.

Correspondingly, when the user continues to ride the bicycle, the above system includes the following.

The bicycle terminal 130 may further include a detection unit 107 which is configured to monitor and obtain information acting on the bicycle from outside.

If the detection unit 107 detects the information acting on the bicycle from outside, The main control unit 1 is further configured to control the second short-distance communication unit 106 to establish a communication connection with the first short-distance communication unit 108, according to the identification information of the user terminal 110 based on the short-range wireless communication protocol. After the communication connection is established, the main control unit 1 is configured to unlock the locking device 105 on the bicycle.

The detection unit 107 of the bicycle terminal 130 is configured to detect signals. According to the preferred embodiment, the detection unit 107 may be a vibration sensor or an acceleration sensor. The information acting on the bicycle from outside may be the information that the user shakes the vehicle. Optionally, the information acting on the bicycle from outside may be a signal detected by the detection unit 107 when a user shakes a bicycle, such as a vehicle head on the bicycle. The working state of the detection unit 107 is controlled by the main control unit 1 on the bicycle terminal 130. The first short-distance communication unit 108 may be the same as the second short-distance communication unit 106.

The specific operation process may be as follows: When the input unit 101 in the user terminal 110 receives a keeping riding instruction generated by the user on the user terminal 110 by triggering the keeping riding button, the specific implementation process is the same as that of in which the user terminal 110 and the cloud management platform 120 and the bicycle terminal 130 cooperate to perform the same process for the user to keep riding the vehicle.

Alternatively, before responding to the first temporary locking instruction, the first short-distance communication unit 106 of the bicycle terminal 130 needs to establish a communication connection with the second short-distance communication unit 104 of the user terminal 110 based on the short-range wireless communication protocol, and stores the identification information of the user terminal 110 in the form of the level signal.

Therefore, when the user returns to continue to ride the bicycle, once the user is familiar with the rules for temporary riding of the bicycle, the user shakes the bicycle. At this time, after the vibration sensor on the bicycle terminal 130 detects the vibration signal generated when the user shakes the bicycle, the main control unit 1 first parses the identification information of the user terminal 110 according to the level signal stored in advance in the bicycle terminal 130, wherein the level signal contains in the identification information of the user terminal 110. The main control unit 1 controls the second short-distance communication unit 106 of the bicycle terminal 130 to send a communication connection establishment request to the surroundings. Preferably, the bicycle terminal 130 stores level signal including a Bluetooth identification of the user terminal 110 in advance, the second short-range communication unit 106 of the bicycle terminal 130, such as Bluetooth communication, and the Bluetooth of the bicycle terminal 130 sends a connection request to the user terminal 110 based on the pre-parsed Bluetooth identification of the user terminal 110. If the communication request is successful, the bicycle terminal 130 and the user terminal 110 successfully establish a communication connection, and the vehicle lock control unit 103 directly controls the locking device 105 on the bicycle to unlock. If the communication request fails, the bicycle terminal 130 does not establish a communication connection with the user terminal 110 based on the short-distance wireless communication protocol according to the identification information of the user terminal 110. And then an alarm message is issued.

Embodiment 2

Figure 3:
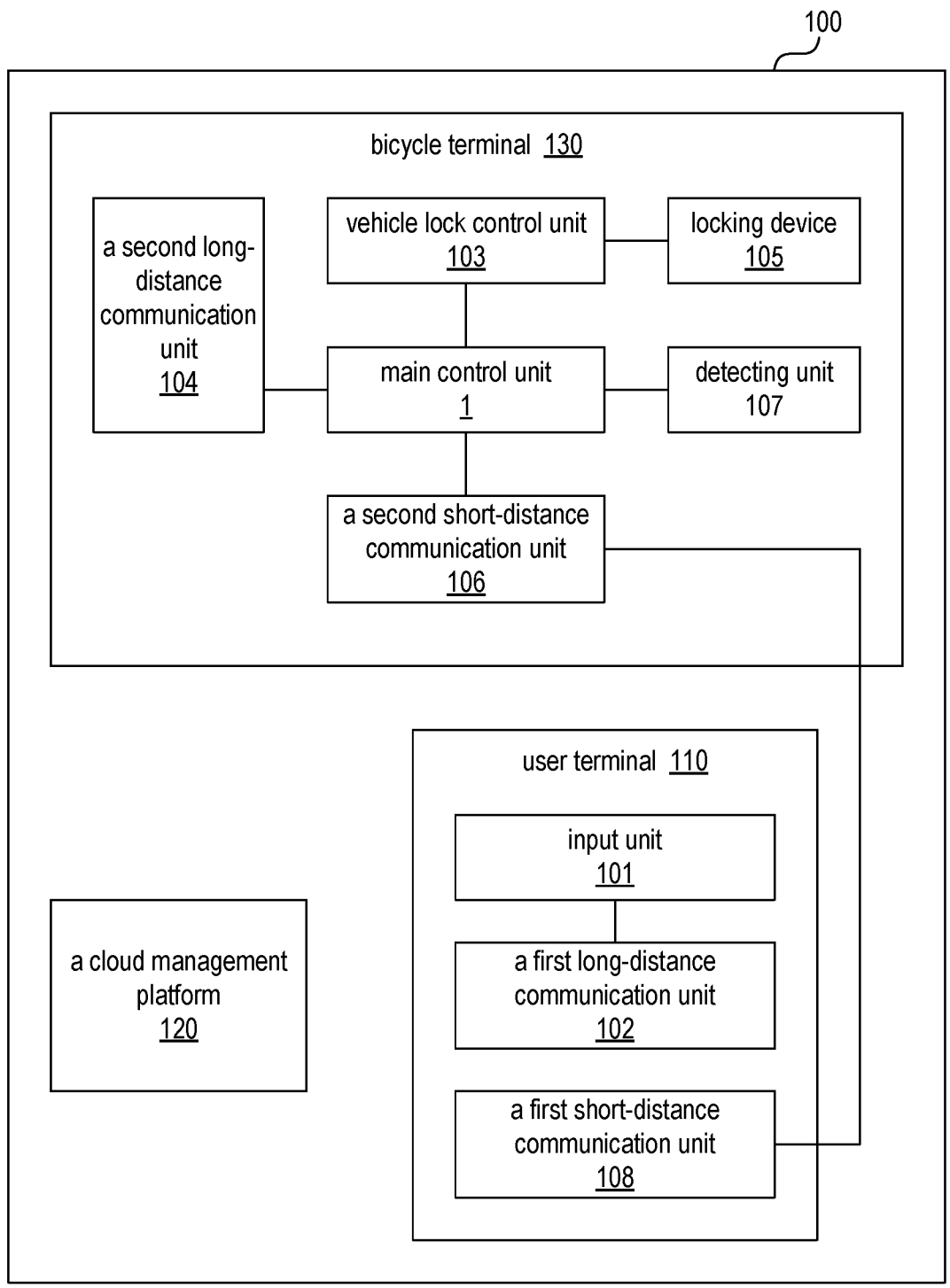
FIG. 3 shows a structural block diagram of a bicycle parking management system disclosed in the second embodiment of the present disclosure.

FIG. 3 is a structural block diagram of a bicycle parking management system provided by Embodiment 2 of the present disclosure. The system is further optimized on the basis of the foregoing embodiment. The entire bicycle parking management system is generally provided by a bicycle terminal 130 provided on the bicycle in cooperation with the user terminal 110 held in hand by the user. As shown in FIG. 3, in this system includes the following.

The user terminal 110 includes a first short-distance communication unit 108 which is configured to send a second temporary locking instruction to the bicycle terminal 130 based on the short-distance wireless communication protocol, after the input unit receives the temporary parking instruction. The bicycle terminal 130 includes a second short-distance communication unit 106 for receiving a second temporary locking instruction sent by the first short-distance communication unit 108. The main control unit 1 is configured to control to send the second temporary locking instruction received by the second short-distance communication unit 106 to the vehicle lock control unit 103. The vehicle lock control unit 103 is configured to lock the locking device 105 on the bicycle according to the second temporary locking instruction.

When the user needs temporary parking, the second temporary locking instruction is a level signal or a pulse signal. The user terminal 110 converts the temporary parking instruction received by the user terminal 110 to the level signal or the pulse signal through the hardware circuit. The temporary parking instruction is generated by the user triggering the temporary parking button.

The specific operation process is as follows. After the input unit 101 of the user terminal 110 receives the unlock request, the input unit 101 sends the unlock request instruction to the bicycle terminal 130 by the first short-distance communication unit 108 in the user terminal 110 which may be directly based on the short-distance wireless communication protocol. The unlock request is generated by achieving the ID number of the bicycle to be unlocked by scanning the QR code on the bicycle to be unlocked, or by entering directly in the user terminal 110 by the user. After the second short-distance communication unit 106 of the bicycle terminal 130 receives the unlock request, the main control unit 1 thereon sends the unlock request received by the second short-distance communication unit 106 to the vehicle lock control unit 103 in the bicycle terminal 130. The vehicle lock control unit 103 generates a specific unlocking signal, such as a level signal. The vehicle lock control unit 103 directly controls the locking device 105 to unlock the bicycle. For example, when the user terminal 110 establishes a communication connection with the bicycle terminal 130 via Bluetooth, the bicycle terminal 130 stores the Bluetooth identification information of the user in the form of a level signal. The Bluetooth identifications of different users are different, and the level signals corresponding to the Bluetooth identifications are different.

According to the embodiment, when the user needs temporary parking, the user terminal 110 receives the temporary parking instruction input by the user triggering the temporary parking button on the user terminal 110. The user may disconnect the first short-distance communication after the unlock is successful. The connection between the unit 108 and the second short-distance communication unit 106 may be disconnected. Therefore, firstly, the first short-distance communication unit 108 in the user terminal 110, such as Bluetooth, needs to send a connection request to establish a communication connection to the second short-distance communication unit 106, such as Bluetooth, in the bicycle terminal 130. The user's Bluetooth identification information is carried in the connection request. The second short-distance communication unit 106 of the bicycle terminal 130 receives the connection request. The connection request may be a level signal containing the Bluetooth identification. The second short-distance communication unit 106 stores the level signal of the Bluetooth identification information and inputs the level signal of the Bluetooth identification information and a level signal of the Bluetooth identification stored by the user when unlocking to the comparator of the bicycle terminal for comparison. If they match, the communication connection is successfully established, and the user terminal 110 sends a second temporary locking instruction to the bicycle terminal 130. After the second short-distance communication unit 106 in the bicycle terminal 130 receives the second temporary locking instruction sent by the user terminal 110, the main control unit 1 in the bicycle terminal 130 sends the second temporary locking instruction received by the second short-distance communication unit 106 to the vehicle lock control unit 103 in the bicycle terminal 130. The vehicle lock control unit 103 generates a signal, such as a level signal, to control the locking device 105 on the bicycle to lock the bicycle.

An embodiment of the present disclosure provides a bicycle parking management system. When a user needs temporary parking, a user terminal sends a second temporary locking instruction directly to the bicycle terminal, and the vehicle lock control unit in the bicycle terminal control to lock the locking device. The bicycle does not need to be manually locked. The user experience is improved. At the same time, because the user terminal directly sends a second temporary locking instruction to the bicycle terminal, there is no need to communicate with the cloud management platform at all times, reducing the bicycle's dependence on the communication signal environment.

Furthermore, when the user needs to continue to ride the locked bicycle, the above system includes the following.

The input unit 101 of the user terminal 110 is further configured to receive a keeping riding instruction triggered by the user. The first short-distance communication unit 108 is further configured to send a second unlocking instruction, after the input unit receives the keeping riding instruction, based on the short-distance wireless communication protocol to the bicycle terminal 130.

The second short-distance communication unit 106 of the bicycle terminal 130 is further configured to receive a second unlocking instruction sent by the first short-distance communication unit 108, and the main control unit 1 is configured to control the second unlocking instruction received by the second short-distance communication unit 106. The second unlocking instruction is sent to the vehicle lock control unit 103, and the vehicle lock control unit 103 is configured to unlock the locking device on the bicycle according to the second unlocking instruction.

The second unlocking instruction corresponds to the second temporary locking instruction. When the user needs to continue to ride the bicycle, the user terminal 110 receives a level signal or a pulse signal. The level signal or the pulse signal is converted by the keeping riding instruction generated by the user triggering the keeping riding button.

Specifically, after the input unit 101 in the user terminal 110 receives the keeping riding instruction generated by the user triggering the keeping riding button on the user terminal 110, the input unit 101 firstly sends the connection request carrying the Bluetooth identification of the user, to establish a communication connection, to the second short-distance communication unit 106 of the bicycle terminal 130. The connection request is sent by the first short-distance communication unit 108 of the user terminal 110, such as Bluetooth. After receiving the connection request, the second short-distance communication unit 106 stores the level signal of the Bluetooth identification information and inputs the level signal of the Bluetooth identification information and a level signal of the Bluetooth identification stored by the user when unlocking to the comparator of the bicycle terminal for comparison. If they match, the communication connection is successfully established, and the user terminal 110 sends a second unlocking instruction to the bicycle terminal 130. After the second short-distance communication unit 106 in the bicycle terminal 130 receives the second unlocking instruction, the main control unit 1 in the bicycle terminal 130 sends the second unlocking instruction received by the second short-distance communication unit 106 to the vehicle lock control unit 103 in the bicycle terminal 130. The vehicle lock control unit 103 generates a signal, such as a level signal, to control the locking device 105 on the bicycle to unlock the bicycle.

The bicycle parking management system provided by this embodiment may further include a detection unit 107. The detection unit 107 may be an acceleration sensor or a vibration sensor. The specific process of continuing to ride the bicycle may be as follows. When the user returns to continue riding the bicycle again, he can shake the bicycle. When the detection unit 107 in the bicycle senses the shaking, a detection signal will be generated. The main control unit 1 in the bicycle terminal 130 controls the second short-distance communication unit 106 of the bicycle terminal 130 to send a communication connection request to the surroundings. Preferably, the second short-distance communication unit 106 of the bicycle terminal 130 communicates with the user terminal 110 via Bluetooth. The bicycle terminal 130 first parses a Bluetooth identification of the user terminal. The Bluetooth identification of the user terminal is parsed by the level signal containing the Bluetooth identification signal of the user terminal 110. The level signal is stored in advance. The bicycle terminal 130 sends a communication connection request to the user terminal 110 having the Bluetooth identification. If the communication connection is successful, the bicycle terminal 130 and the user terminal 110 successfully establish a communication connection. The vehicle lock control unit 103 directly controls the locking device 105 on the bicycle to unlock the bicycle.

In addition, the detection unit may be a human-computer interaction device provided on a bicycle, such as a button. Correspondingly, the specific process of continuing riding the bicycle may be as follows. When the user returns to continuing riding the bicycle again, by pressing the button on the bicycle, a detection signal will be generated. The subsequent specific operation process is similar to the above.

An embodiment of the present disclosure provides a bicycle parking management system. When a user needs to continue riding the bicycle, a second unlocking instruction is directly sent to the bicycle terminal through the user terminal, and the vehicle lock control unit in the bicycle terminal controls unlocking of the bicycle. The locking device does not need to be manually unlocked, thus improving the user experience. At the same time, because the user terminal directly sends a second unlocking instruction to the bicycle terminal, there is no need to communicate with the cloud management platform at all times, reducing the bicycle's dependence on the communication signal environment.

Embodiment 3

Figure 4:
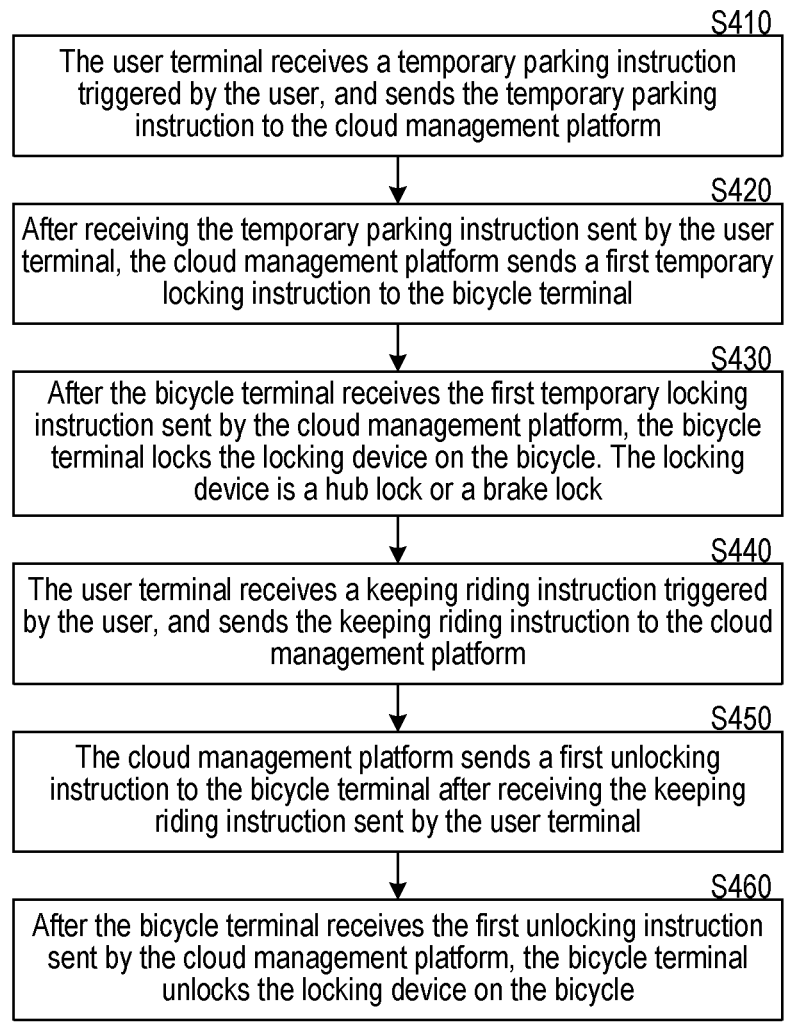
FIG. 4 shows a flowchart of a bicycle parking management method disclosed in the third embodiment of the present disclosure.

FIG. 4 is a flowchart of a bicycle parking management method provided by Embodiment 3 of the present disclosure. The method is suitable the situation for a user who needs to temporarily park the bicycle to handle other things while riding the bicycle and then unlock the bicycle. The entire set of bicycle parking management method is usually implemented by the bicycle terminal provided on the bicycle, the user terminal held by the user, and the cloud management platform. The method provided by this embodiment can be executed by the bicycle parking management system. As shown in FIG. 4, the method specifically includes the following.

S410: The user terminal receives a temporary parking instruction triggered by the user, and sends the temporary parking instruction to the cloud management platform.

Bicycles are generally equipped with locks, thus requiring the user to request operations such as unlocking the bicycle and parking the bicycle. The user terminal is provided with an input unit and a first long-distance communication unit. The input unit may be a button on the user terminal, such as a virtual touch screen button, a physical button or a knob, etc., or a scanning frame, such as a two-dimensional code or barcode scanning box, etc. Preferably, the input unit may include a temporary parking button for receiving a temporary parking instruction input by the user. The temporary parking instruction is a level signal or a pulse signal generated when the user triggers the temporary parking button on the user terminal. The temporary parking button may include the identification of the bicycle and the identification of the user terminal. The identification of the bicycle refers to the unique sign used to identify the bicycle, such as pileless bicycles. Each bicycle has a unique vehicle number, which can be an ID number on a bicycle, such as a string of numbers, letters, or a combination of both. The identification of the user terminal may be a phone number of the user terminal or the like. The first long-distance communication unit can use a SIM card on a user terminal, and connect to a mobile communication network such as 3G/4G, GPRS, etc. via the SIM card to achieve remote communication.

S420: After receiving the temporary parking instruction sent by the user terminal, the cloud management platform sends a first temporary locking instruction to the bicycle terminal.

The bicycle terminal in a bicycle may be an electronic device. The electronic device may be integrated with the bicycle lock and configured on the bicycle, or may be configured separately from the lock on the bicycle.

After the cloud management platform receives the temporary parking instruction sent by the user terminal, the processing of the temporary parking instruction can be implemented in software or hardware circuits. For example, the temporary parking instruction is converted to level signal or pulse signal, which represents the first temporary locking instruction. Specifically, the first temporary parking instruction refers to a signal generated by the cloud management platform according to the phone number of the user terminal and the ID of the bicycle when the cloud management platform receives the temporary parking instruction sent by the user terminal when the user needs to park temporarily. Exemplarily, the first temporary locking instruction may include the ID of the bicycle.

When the cloud management platform receives the temporary parking instruction sent by the user terminal, it sends a first temporary parking lock instruction to the bicycle terminal, and monitors the lock of the bicycle in real time. The bicycle terminal has a second long-distance communication unit that can be used to receive the first temporary locking instruction sent by the cloud management platform. The second long-distance communication unit is similar to the first long-distance communication unit of the user terminal.

S430: After the bicycle terminal receives the first temporary locking instruction sent by the cloud management platform, the bicycle terminal locks the locking device on the bicycle. The locking device is a hub lock or a brake lock.

After the first temporary locking instruction is received by the second long-distance communication unit of the bicycle terminal, the main control unit sends the first temporary locking instruction to the vehicle lock control unit of the bicycle. The first temporary locking instruction is received by the second long-distance communication unit in the bicycle terminal. The vehicle lock control unit is configured to control the locking device to lock the bicycle or to unlock the bicycle.

After the temporary locking instruction, corresponding operations will be performed by the vehicle lock control unit, such as generating a level signal or a pulse signal for locking the bicycle. After the vehicle lock control unit generates a signal for the user to lock the bicycle, the locking device on the control bicycle locks the bicycle. Therein, the locking device may be a hub lock, a faucet lock, or a brake lock. The brake lock refers to a lock that can stop a bicycle from moving forward after receiving a locking instruction. Preferably, the locking device is a hub lock. The main control unit can be a hardware circuit integrated with a variety of chips such as a single chip microcomputer to control the working status of each unit of the bicycle terminal. The vehicle lock control unit can be implemented by hardware circuits or by software. The hardware circuit, such as a level signal generated by a circuit composed of switches, controls the locking device on the bicycle to lock the bicycle or unlock the bicycle.

Furthermore, after the vehicle lock control unit in the bicycle controls the bicycle to be locked, the feedback information is sent to the cloud management platform. Therein, the feedback information is the information sent to the cloud management platform that the bicycle is successfully locked after the bicycle terminal controls the bicycle to be locked.

Exemplarily, after the cloud management platform receives the information about the successfully locked sent by the bicycle terminal. The cloud management platform finds the bicycle in the database of the bicycle management system based on the bicycle ID, marks the status of the bicycle as temporarily locked, records the current time as the start time of the temporary locking to make the cloud management platform calculate the consumption cost of the current rental of the bicycle by the user. Optionally, after the cloud management platform marks the state of the bicycle as temporarily locked, if an unlock request from another user using the locked bicycle is received, the cloud management platform sends a reminder message to the other user. The reminder message can be sent to the other user's mobile terminal to remind the other user that the bicycle has been temporarily parked by the user and is temporarily unavailable.

An embodiment of the present disclosure provides a bicycle parking management method. When a user needs temporary parking, a temporary parking instruction is sent to a cloud management platform through a user terminal, and the bicycle management terminal controls the bicycle terminal to lock the locking device on the bicycle. No manual locking is needed, thus improving the user's experience and providing a new solution for managing bicycle parking.

Furthermore, when the user needs to continue to ride the locked bicycle the user has locked it, namely after the bicycle terminal has locked the locking the device in the bicycle, the above method may further include the following.

S440. The user terminal receives a keeping riding instruction triggered by the user, and sends the keeping riding instruction to the cloud management platform.

Among them, the user terminal is further provided with a keeping riding button. When the user triggers the keeping riding button on the user terminal, the keeping riding instruction will be generated. The keeping riding instruction may include the identification of the bicycle and the identification of the user terminal. Preferably, the identification of the bicycle is a bicycle ID, and the identification of the user terminal is a user's phone number.

When the input unit in the user terminal receives the keeping riding instruction generated by the user clicking the keeping riding button on the user terminal, the long-distance communication unit in the user terminal sends the keeping riding instruction to the cloud management platform based on the long-distance communication protocol.

S450: The cloud management platform sends a first unlocking instruction to the bicycle terminal after receiving the keeping riding instruction sent by the user terminal.

The first unlocking instruction corresponds to the first temporary locking instruction, which means that the first unlocking instruction is a instruction generated according to the phone number of the user terminal and the bicycle ID, when the user needs to continue riding the bicycle, the cloud management platform receives the keeping riding instruction sent by the user terminal. Exemplarily, the ID of the bicycle may be included in the first unlocking instruction.

After the cloud management platform receives the keeping riding instruction from the user terminal, the cloud management platform compares the phone number of the user terminal and bicycle ID, which is carried by the keeping riding instruction, and the telephone number of the user terminal and the bicycle's ID, which is stored in advance in the database of the management system, to determine whether the received keeping riding instruction is issued by the user who initiated the temporary parking instruction.

If the keeping riding instruction is issued by the user who initiated the temporary parking instruction, the cloud management platform sends a first unlocking instruction to the second long-distance communication unit of the bicycle terminal. After the second long-distance communication unit receives the first unlock instruction, the main control unit of the bicycle terminal sends the first unlocking instruction received by the second long-distance communication unit to the vehicle lock control unit in the bicycle terminal. The vehicle lock control unit controls the bicycle to unlock.

S460. After the bicycle terminal receives the first unlocking instruction sent by the cloud management platform, the bicycle terminal unlocks the locking device on the bicycle.

When the vehicle lock control unit of the bicycle terminal receives the first unlocking command sent by the second long-distance communication unit, the vehicle lock control unit generates a signal for unlocking the bicycle, such as a level signal, to control a locking device on the bicycle to unlock the bicycle.

Furthermore, after the vehicle lock control unit in the bicycle controls the bicycle to be unlocked, feedback information is sent to the cloud management platform. Therein, the feedback information is the information sent to the cloud management platform that the bicycle unlocking is successful after the bicycle terminal controls the bicycle to be unlocked.

For example, after the cloud management platform receives the bicycle unlocking success message sent by the bicycle terminal, the cloud management platform finds the bicycle in the database of the bicycle management system according to the bicycle ID, changes the status flag of the bicycle to riding, and records the current time as the end time of the temporary locking.

An embodiment of the present disclosure provides a bicycle parking management method. When a user needs to continue to ride a bicycle, the user terminal sends a keeping riding instruction to the cloud management platform. The cloud management platform controls the locking device on the bicycle to unlock the bicycle. There is no need to manually unlock the bicycle, thus improving the user experience, and also providing a new solution for managing bicycle parking.

Embodiment 4

Figure 5:
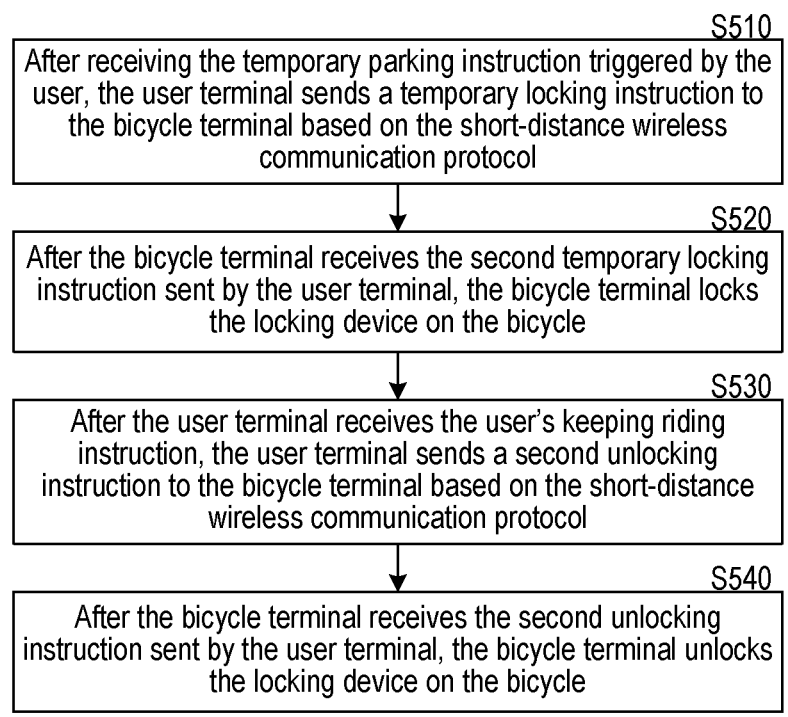
FIG. 5 shows a flowchart of a bicycle parking management method disclosed in the fourth embodiment of the present disclosure.

FIG. 5 is a flowchart of a bicycle parking management method provided in Embodiment 4 of the present disclosure. The method is further optimized based on the above embodiments. The entire bicycle parking management method generally needs a bicycle terminal and the user terminal held by the user to cooperate with each other. The method provided in this embodiment can be executed by a bicycle parking management system. As shown in FIG. 5, the method specifically includes the following.

S510. After receiving the temporary parking instruction triggered by the user, the user terminal sends a second temporary locking instruction to the bicycle terminal based on the short-distance wireless communication protocol.

The second temporary parking lock instruction is a level signal or a pulse signal. The user terminal converts the temporary parking instruction to the level signal or the pulse signal. The temporary parking instruction is generated by the user triggering the temporary parking button when the user needs temporary parking. The short-range wireless communication protocol may be one of, for example, WIFI (Wireless Fidelity, Wireless Fidelity), ZIGBEE, or BT (Bluetooth).

S520. After the bicycle terminal receives the second temporary locking instruction sent by the user terminal, the bicycle terminal locks the locking device on the bicycle.

Specifically, the user terminal may include a first short-distance communication unit, and correspondingly, the bicycle terminal has a second short-distance communication unit. The first short-distance communication unit may be any one of, for example, a WIFI (Wireless Fidelity) unit, a ZIGBEE unit, and a BT (bluetooth) unit. The first short-distance communication unit may be the same as the second short-distance communication unit. Bluetooth is preferred.

When the user terminal receives the temporary parking instruction input by the user triggering the temporary parking button on the user terminal, the user terminal establishes a communication connection with the bicycle terminal via Bluetooth. Specifically, the user terminal communicates via Bluetooth with the second short-distance communication unit of the bicycle terminal (such as Bluetooth) by sending a request carrying the user's Bluetooth identification information for establishing a communication connection. After the second short-distance communication unit of the bicycle terminal receives the request which may be a level signal containing the Bluetooth identification, the received level signal and the level signal containing the user's Bluetooth identification information stored when unlocking are input to the comparator of the bicycle terminal for comparison. If they match, the communication connection is successfully established. The user terminal sends a second temporary locking instruction to the bicycle terminal. After the second short-distance communication unit in the bicycle terminal receives the second temporary locking instruction sent by the user terminal, the main control unit in the bicycle terminal sends the second temporary locking instruction received by the second short-distance communication unit to the vehicle lock control unit in the bicycle terminal. The vehicle lock control unit generates a signal for locking the bicycle, such as a level signal, to control the locking device on the bicycle to lock the bicycle.

An embodiment of the present disclosure provides a bicycle parking management method. When a user needs temporary parking, the user sends a second temporary locking instruction directly to the bicycle terminal through the user terminal. The vehicle lock control unit in the bicycle terminal controls the locking device on the bicycle to lock the bicycle, thus eliminating the need for manual locking the bicycle and improving the user experience. The terminal sends a second temporary locking instruction, which does not need to communicate with the cloud management platform at all times, which reduces the dependence of the bicycle on the communication signal environment.

Furthermore, when the user needs to continue to ride the locked bicycle, that is, after the bicycle terminal locks the locking device on the bicycle, the above method may further include the following.

S530. After the user terminal receives the user's keeping riding instruction, the user terminal sends a second unlocking instruction to the bicycle terminal based on the short-distance wireless communication protocol.

The second unlocking instruction corresponds to the second temporary locking instruction. When the user needs to continue riding the bicycle, the user terminal 110 receives a level signal or a pulse converted by the keeping riding instruction generated by the user triggering the keeping riding button.

S540. After the bicycle terminal receives the second unlocking instruction sent by the user terminal, the bicycle terminal unlocks the locking device on the bicycle.

Exemplarily, when the user needs to continue to ride the locked bicycle, that is, after the bicycle terminal locks the locking device on the bicycle, it may also operate as following. If the bicycle terminal detects information acting on the bicycle from the outside, according to the identification information of the user terminal, the bicycle terminal establishes a communication connection with the user terminal based on the short-distance wireless communication protocol to unlock the locking device on the bicycle.

An embodiment of the present disclosure provides a bicycle parking management method. When a user needs to continue riding a bicycle, a second unlocking instruction is directly sent to the bicycle terminal through the user terminal, and the vehicle lock control unit in the bicycle terminal unlocks the locking device in the bicycle. The locking device does not need to be manually unlocked, thus improving the user's experience. At the same time, because the user terminal directly sends a second unlocking instruction to the bicycle terminal, there is no need to communicate with the cloud management platform at all times, thus reducing the bicycle's dependence on the communication signal environment.

Embodiment 5

Figure 6:
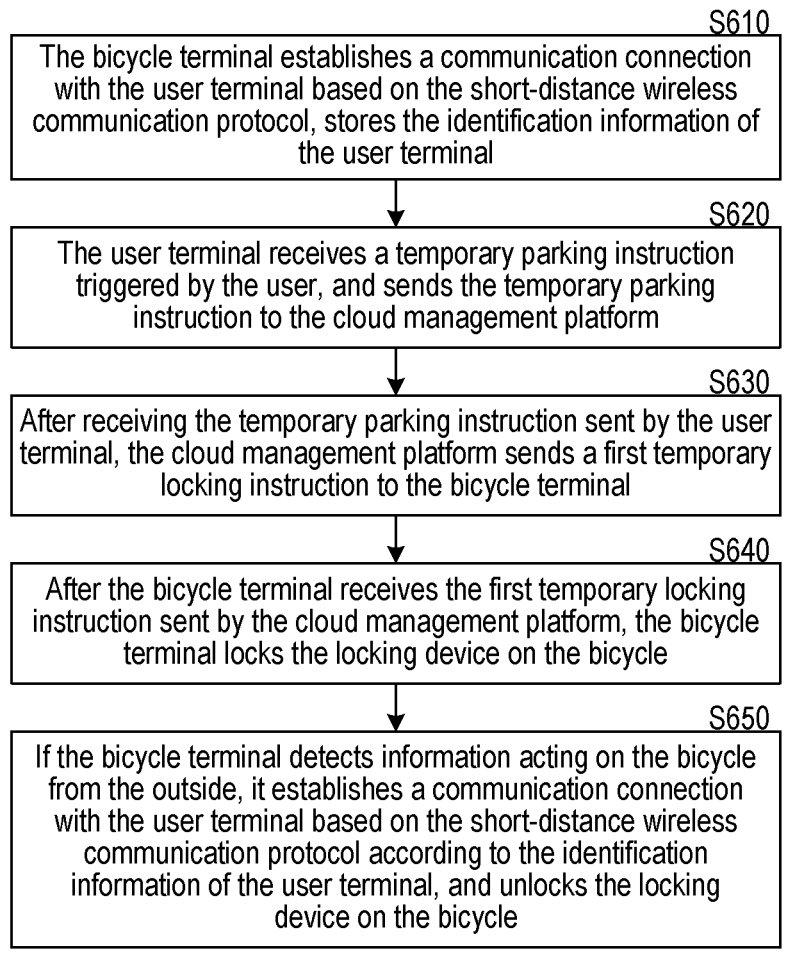
FIG. 6 shows a flowchart of a bicycle parking management method disclosed in the fifth embodiment of the present disclosure.

FIG. 6 is a flowchart of a bicycle parking management method provided by Embodiment 5 of the present disclosure. The method is further optimized based on the foregoing embodiments. The entire bicycle parking management method is generally implemented by a bicycle terminal provided on a bicycle, the user terminal held by the user and the cloud management platform. The method provided in this embodiment can be executed by a bicycle parking management system. As shown in FIG. 6, the method specifically includes the following.

S610: The bicycle terminal establishes a communication connection with the user terminal based on the short-distance wireless communication protocol, and stores the identification information of the user terminal.

The identification information of the user terminal is an identification of a communication method used, such as a Bluetooth identification. The communication method is used when the second short-distance communication unit of the bicycle terminal establishes a communication connection with the first short-distance communication unit of the user terminal based on the short-distance wireless communication protocol.

S620: The user terminal receives a temporary parking instruction triggered by the user, and sends the temporary parking instruction to the cloud management platform.

S630: After receiving the temporary parking instruction sent by the user terminal, the cloud management platform sends a first temporary locking instruction to the bicycle terminal.

S640: After the bicycle terminal receives the first temporary locking instruction sent by the cloud management platform, the bicycle terminal locks the locking device on the bicycle.

After the input unit in the user terminal receives the temporary parking instruction generated by the user triggering the temporary parking button on the user terminal, its specific implementation process is the same as the implementation process performed in cooperation with the above the user terminal, the cloud management platform, and the bicycle terminal to implement the user's temporary parking.

An embodiment of the present disclosure provides a bicycle parking management method. When a user needs temporary parking, a temporary parking instruction is sent to a cloud management platform through a user terminal, and the bicycle management terminal controls the bicycle terminal to lock the locking device on the bicycle. No manual locking is needed, thus improving the user's experience and also providing a new solution for managing bicycle parking.

Furthermore, when the user needs to continue riding the locked bicycle, that is, after the bicycle terminal locks the locking device on the bicycle, the above method may further include the following.

S650: If the bicycle terminal detects information acting on the bicycle from the outside, it establishes a communication connection with the user terminal based on the short-distance wireless communication protocol according to the identification information of the user terminal, and unlocks the locking device on the bicycle.

A detection unit is provided in the bicycle terminal to detect signals. Preferably, the detection unit may be a vibration sensor or an acceleration sensor.

For example, when the user needs to continue riding the bicycle, that is, the vibration sensor on the bicycle terminal detects that the user shakes the bicycle to generate a vibration signal, and then transmits the vibration signal to the bicycle terminal. After the bicycle terminal receives the vibration signal, firstly, it sends a request for establishing a communication connection to the surroundings through the bicycle terminal, according to the identification information of the user terminal stored in advance in the bicycle terminal. Preferably, the Bluetooth identification of the mobile phone is stored in advance in the bicycle terminal. The bicycle terminal sends a request to establish a communication connection to the user terminal via Bluetooth, according to the Bluetooth identification stored in advance in the bicycle terminal. If the request is successful, the bicycle terminal successfully establishes a communication connection with the user terminal, that is, the mobile phone, and the bicycle terminal directly controls the locking device on the bicycle to unlock the bicycle.

Furthermore, after the bicycle terminal detects the information acting on the bicycle from the outside, the method may further include the following.

An alarm message is issued li the bicycle terminal fails to establish the communication connection with the user terminal based on the short-distance wireless communication protocol according to the identification information of the user terminal.

The alarm message may be in the form of voice, light, or text. For example, the vehicle lock control unit or the detection unit of the bicycle terminal controls the sound player on the vehicle to make a dip sound or the voice broadcast "you are not the current user, please select another bicycle," etc. Of course, the alarm message may also be in multiple forms at the same time, for example, both the voice and the text on the display of the user terminal.

Optionally, when the user needs to continue riding the locked bicycle, namely, after the bicycle terminal locks the locking device on the bicycle, the method of unlocking the bicycle may also be the same as the process for the user to continue riding the bicycle which is performed in cooperation with the above-mentioned user terminal, the cloud management platform and the bicycle terminal.

According to an embodiment of the present invention, the method for managing a locked bicycle is provided. When a user want to temporarily lockithe bicycle, the user may send a temporary locking request. When the user wants to end the temporary locking of the bicycle and continue riding the bicycle, the user may send an unlocking request. For example, a user may send a temporary locking request and a temporary unlocking request through an application (App) installed on their terminal. The temporary locking request and the temporary unlocking request may be sent from the user's smart terminal to the remote management server or the bicycle. For example, the temporary locking request and the temporary unlocking request may be sent from the user terminal to the remote management server via a long-distance communication link (e.g. 4G network, 5G network, Internet, etc.) between the user terminal and the remote management server. For example, the temporary locking request and the temporary unlocking request may be sent from the user terminal to the bicycle via a short-distance communication link between the user terminal and the bicycle (e.g. Bluetooth, Wi-Fi, ZigBee, near-field infrared technology, etc.).

Figure 7:
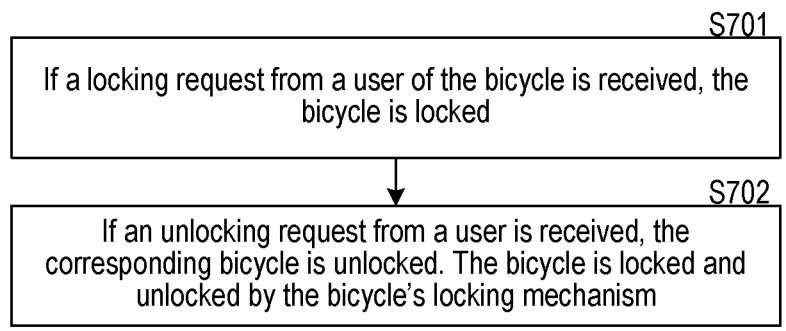
FIG. 7 is a flowchart of a method for managing locking of a vehicle disclosed in an embodiment of the present disclosure.

FIG. 7 is a flowchart of a method for managing a locked vehicle according to an embodiment of the present disclosure. In step S701, if a locking request from a user of the bicycle is received, the bicycle is locked. The locking request may be received by a remote management server from a user's user equipment (for example, a smart phone) via a long-distance communication network, or may be received by a bicycle from a user via a short-distance communication network. In step S702, if an unlocking request from a user is received, the corresponding bicycle is unlocked. The bicycle is locked and unlocked by the bicycle's locking mechanism. The locking mechanism may be a bearing lock provided at the axle, or any other locking mechanism capable of stopping the movement of the bicycle. In the method for managing a locked bicycle in this embodiment, neither locking nor unlocking of the bicycle requires a manual operation of the locking mechanism by the user. For example, the user only needs to operate the application running on his smart terminal to lock and unlock the bicycle without having to manually operate the bicycle's bearing lock.

In one non-limiting example, the user's locking request and unlocking request are sent from the user terminal to the remote management server via a long-distance communication link between the user terminal and the remote management server. The locking of the bicycle may include: (1) the remote management server sends a locking instruction to the bicycle via the long-distance communication link, and (2) when the locking instruction is received, the locking mechanism provided in the bicycle locks the bicycle. The unlocking of the bicycle may include: (a) the remote management server sends an unlocking instruction to the bicycle via the long-distance communication link, and (b) when the unlocking instruction is received, the bicycle is unlocked through the locking mechanism provided thereon. The locking mechanism can lock the vehicle without the user's manual operation. For example, the locking mechanism may be a bearing lock provided at a bearing of the bicycle. The bearing lock may automatically lock the bicycle bearing and unlock the bicycle bearing according to an instruction sent by the central control device of the vehicle, without requiring the user to lock the bearing manually.

In a non-limiting embodiment, the user's locking request is sent from the user terminal to the remote management server via a long-distance communication link between the user terminal and the remote management server. The user's unlocking request is transmitted to the bicycle from the user terminal via a short-distance communication link between the user terminal and the bicycle. The bicycle may be provided with a wireless communication module for short-distance communication with the user terminal, such as a Bluetooth module, a Wi-Fi module, a ZigBee module, a near-field infrared module, and so on. The user's unlocking request can be sent to the bicycle's wireless communication module via a short-distance communication link. The control device of the bicycle (for example, the central controller of the bicycle) may be configured to instruct the locking mechanism of the bicycle to perform the unlocking operation after receiving the user's unlocking request, so that the user can continue to ride the bicycle.

In one non-limiting embodiment, the user's locking request is sent from the user terminal to the bicycle via a short-distance communication link between the user terminal and the bicycle. For example, a user may send a locking request directly to the bicycle through a short-distance communication link between the user terminal and the bicycle. The user's unlocking request may also be sent from the user terminal to the bicycle via a short-distance communication link between the user terminal and the bicycle. In this case, the bicycle's control device can independently control the lock on the bicycle to execute the locking or unlocking operation without a remote management server.

In one non-limiting embodiment, the user's unlocking request is received by the bicycle through a user's specific operation on the bicycle. For example, the user's unlocking request is sent to the bicycle by the user's shaking of the bicycle. For example, the bicycle may be provided with a motion sensor such as an accelerometer, which may recognize a user's shaking of the bicycle. The shaking mode may be preset, for example, shaking the bicycle laterally three times, or swinging the handlebar three times. When the motion sensor recognizes the user's specific operation on the bicycle, the bicycle receives the user's unlocking request.

Before unlocking the bicycle, the user's identity may be verified. In one embodiment, the remote management server may compare the user ID that sent the locking request with the user ID that sent the unlocking request. Only when the remote management server confirms that the user who sent the unlocking request is the same as the user who previously sent the locking request, namely, only when the users are the same user, an unlocking instruction is sent to the bicycle. This user verification may also be performed at the bicycle side. In one embodiment, when the remote management server sends the locking instruction and the unlocking instruction to the bicycle, the remote management server also sends the identification of the user who sent the locking request and the identification of the user who sent the unlocking request to the bicycle. The unlocking mechanism of the vehicle unlocks the bicycle only when the user who requested the unlocking is the same user as the user who previously sent the locking request. In one embodiment, the user needs to re-scan the QR code on the bicycle to send the user's identity information to the remote management server or to the bicycle. The remote management server or the bicycle judges whether the user re-scanning the QR code is the same user requesting previously locking the bicycle. Only when it is determined that the user re-scanning the QR code is the same user who previously sent the locking request, is the bicycle is unlocked. In one embodiment, only a user corresponding to the user equipment that has established a short-distance communication link with the bicycle when sending the locking request can send the unlocking request in a manner that shakes the bicycle.

During a period when the bicycle is locked (for example, a temporary locking period after the bicycle's locking mechanism is locked and before the locking mechanism is re-unlocked), the account of the user of the bicycle may continue to be charged. The rate during the temporary locking period may be lower than the rate during normal use of the bicycle. In some instances, for some users who reach a certain level, the rate during the temporary locking period may be free, or free for a certain period of time.

While the bicycle is temporarily locked, it cannot be unlocked or riddenby other users. The status information of the bicycle that the bicycle has been temporarily locked may be displayed through a display device or a voice device provided on the bicycle. For example, an audio device may be provided on a bicycle, and when another user intends to unlock and ride the bicycle, a voice of "temporarily locked and unavailable" may be broadcast. During the temporary locking period of the bicycle, the bicycle is in a state of being unsearchable, and other users will not be able to view the bicycle from the booking software. According to an embodiment of the present invention, a system for managing a locked bicycle is provided. The system may include: one or more bicycles provided with a locking mechanism for locking the bicycle, and a server configured to receive a locking request from a user of the bicycle and send a locking instruction to the bicycle to lock the bicycle, receive a unlocking request from a user for riding the bicycle, and send an unlocking instruction to the bicycle to unlock the bicycle. In the system for managing the locked bicycle in this embodiment, neither the locking nor unlocking of the vehicle requires a manual operation of the locking mechanism by the user. In some embodiments, communication between the server and the bicycle is achieved through a long-distance communication link therebetween. In some embodiments, the server may verify the identity of the user who sent the locking request and the unlocking request. Only when the user who sent the unlocking request and the user who sent the locking request are the same, does the server send the unlock instruction to unlock the bicycle.

According to an embodiment of the present disclosure, a bicycle is provided with a locking mechanism for locking the bicycle, a controller configured to: (1) receive a locking instruction, (2) once receiving a locking instruction, the lock mechanism is used to lock the bicycle, (3) receive an unlock instruction and (4) once receiving the unlock instruction, the lock mechanism is controlled to unlock the bicycle. In a non-limiting embodiment, the controller is further configured to verify the identity of the user sending the unlocking instruction. Only when the user associated with the unlocking instruction and the user associated with the locking instruction are the same user, does the locking mechanism unlock bicycle. In one non-limiting embodiment, both the locking instruction and the unlocking instruction are received by a remote management server. In other embodiments, both the lock instruction and the unlock instruction are received by the user terminal. In other embodiments, the one of the locking instruction and the unlocking instruction is received by the remote management server, and the other one is received by the user terminal. In other embodiments, the terminal may be provided with a motion sensor to identify a specific operation to the bicycle by the user. For example, the unlocking instruction is received through a specific operation to the bicycle by the user (for example, a specific mode of shaking). In one non-limited embodiment, the bicycle may include a display device to display a state in which the bicycle is temporarily locked by another user and therefore cannot serve other users.

According to an embodiment of the present invention, a user interface on a user equipment is provided. The user interface may be provided by a computer program running on a user terminal. In a non-limiting embodiment, a user of a bicycle may send a locking request and/or an unlocking request to a remote management server or the bicycle by using the user interface, thereby achieving a temporary locking on the bicycle. In a non-limiting embodiment, a prompt to park a bicycle in a prescribed parking area, a prompt of a nearby prescribed parking area, and a prompt of a route guide to the prescribed parking area may be displayed by using the user interface. In some embodiments, the prescribed parking area may be an area where bicycle can be parked, which is planned by the government's traffic management department. In some embodiments, the prescribed parking area may be an area where a bicycle maintenance device is provided. A plurality of alternative prescribed parking areas may be provided to the user based on the location of the user. The user may select one of the prescribed parking areas and obtain a route prompt to reach the prescribed parking area.

A bicycle parking management method according to an embodiment of the present disclosure includes: providing a user interface on a user terminal; and providing a device on the user interface that allows a user to send a locking request and/or an unlocking request. In a preferred embodiment, the locking request is a temporary locking request. In a preferred embodiment, after the user terminal receives the locking request input by the user, a device allows users to choose whether to park their bicycles at a nearby parking spots and/or park nearby. In an alternative embodiment, the nearby parking spots include an area where parking is prescribed.

It should be understood that the above embodiments are the only preferred embodiments of the present disclosure and the technical principles applied. Those skilled in the art understand that the present disclosure is not limited to the specific embodiments described herein, and it is possible for those skilled in the art to make various obvious changes, readjustments and substitutions without departing from the scope of protection of the present disclosure. Therefore, although the present disclosure has been described in more detail through the above embodiments, the present disclosure is not limited to the above embodiments, and may include more other equivalent embodiments without departing from the concept of the present disclosure, and the present disclosure The scope is determined by the scope of the appended claims.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A bicycle parking management method, comprising:
   receiving, by a user terminal, a temporary parking instruction triggered by a user,
   wherein the temporary parking instruction includes a user ID and a bicycle ID;
   sending, by the user terminal, the temporary parking instruction to a cloud management platform;
   sending, by the cloud management platform, a first temporary locking instruction to a bicycle terminal, located on a bicycle, after receiving the temporary parking instruction sent by the user terminal;
   locking, by the bicycle terminal, a locking device on the bicycle, after receiving the first temporary locking instruction sent by the cloud management platform,
   wherein the first temporary locking instruction includes a bicycle ID; and
   generating an alarm message when the bicycle ID of the first temporary locking instruction does not match the bicycle ID of the temporary parking instruction.

2. The method of claim 1, further comprising:
   after the bicycle terminal locks the locking device on the bicycle:
      receiving, by the user terminal, a keeping riding instruction triggered by the user, and sending the keeping riding instruction to the cloud management platform;
      receiving, by the cloud management platform, the keeping riding instruction sent by the user terminal, and sending a first unlocking instruction to the bicycle terminal; and
      unlocking, by the bicycle terminal, the locking device on the bicycle after receiving the first unlocking instruction sent by the cloud management platform.

3. The method of claim 1, further comprising:
   sending, by the user terminal, a second temporary locking instruction to the bicycle terminal based on a short-distance wireless communication protocol, after receiving the temporary parking instruction triggered by the user; and
   locking, by the bicycle terminal, the locking device on the bicycle, after receiving the second temporary vehicle lock instruction sent by the user terminal.

4. The method of claim 3, further comprising:
   after the bicycle terminal locks the locking device on the bicycle:
      receiving, by the user terminal, a keeping riding instruction, and sending a second unlocking instruction to the bicycle terminal based on the short-distance wireless communication protocol; and
      unlocking, by the bicycle terminal, the locking device on the bicycle, after receiving the second unlocking instruction sent by the user terminal.

5. A bicycle parking management system, comprising:
   a user terminal, a bicycle terminal located on a bicycle, and a cloud management platform, wherein:
      the user terminal comprises an input unit and a first long-distance communication unit, wherein:
         the input unit is configured to receive a temporary parking instruction triggered by a user,
         wherein the temporary parking instruction includes a user ID and a bicycle ID; and
         the first long-distance communication unit is configured to send the temporary parking instruction to the cloud management platform when the input unit receives the temporary parking instruction;
      the cloud management platform is configured to send a first temporary parking instruction to the bicycle terminal after receiving the temporary parking instruction sent by the user terminal; and
      the bicycle terminal comprises a vehicle lock control unit, a second long-distance communication unit, a main control unit, and a locking device, wherein:

the second long-distance communication unit is configured to receive the first temporary parking sent by the cloud management platform;

the main control unit is configured to control to send the first temporary locking instruction received by the second long-distance communication unit to the device lock control unit;

the device lock control unit is configured to lock the locking device on a bicycle according to the first temporary locking instruction, wherein the first temporary locking instruction includes a bicycle ID; and the device lock control unit is further configured to generate an alarm message when the bicycle ID of the first temporary locking instruction does not match the bicycle ID of the temporary parking instruction.

6. The system of claim 5, wherein:

the input unit of the user terminal is further configured to receive a keeping riding instruction, and the first long-distance communication unit is further configured to, after the input unit receives the keeping riding instruction, send the keeping riding instruction to the cloud management platform;

the cloud management platform is further configured to send a first unlocking instruction to the bicycle terminal after receiving the keeping riding instruction sent by the user terminal; and the second long-distance communication unit of the bicycle terminal is further configured to receive the first unlocking instruction sent by the cloud management platform, the main control unit is configured to control to send the first unlock instruction received by the second long-distance communication unit to the vehicle locking control unit, and the vehicle lock control unit is configured to unlock the locking device on the bicycle according to the first unlocking instruction.

7. The system of claim 5, wherein:

the user terminal further comprises a first short-distance communication unit, wherein the first short-distance communication unit is configured to send a second temporary locking instruction to the bicycle terminal based on a short-distance wireless communication protocol after the input unit receives the temporary parking instruction;

the bicycle terminal further comprises a second short-distance communication unit, wherein the second short-distance communication unit is configured to receive the second temporary locking instruction sent by the first short-distance communication unit, the main control unit is configured to control to send the second temporary locking instruction received by the second short-distance communication unit to the vehicle lock control unit, and the vehicle lock control unit is configured to lock the locking device on the bicycle according to the second temporary vehicle lock instruction.

8. The system of claim 7, wherein:

the input unit of the user terminal is further configured to receive the keeping riding instruction triggered by the user, and the first short-distance communication unit is further configured to, after the input unit receives the keeping riding instruction, send the second unlock instruction to the bicycle terminal based on the short-distance wireless communication protocol;

the second short-distance communication unit of the bicycle terminal is further configured to receive the second unlocking instruction sent by the first short-distance communication unit, the main control unit is further configured to control to send the second unlocking instruction received by the second short-range communication unit to the vehicle locking control unit, and the vehicle lock control unit is configured to unlock the locking device on the bicycle according to the second unlocking instruction.

9. A method for managing locking of a bicycle, comprising:

locking a bicycle when receiving a locking request to the bicycle sent by a user of the bicycle;

unlocking the bicycle when receiving an unlocking request sent by the user of the bicycle; and using a locking mechanism of the bicycle for the locking of the bicycle and the unlocking of the bicycle, wherein the locking the bicycle and the unlocking the bicycle do not require manual operation of the locking mechanism by the user, wherein the locking request includes a bicycle ID, wherein the unlocking request includes a bicycle ID, and wherein an alarm message is generated when the bicycle ID of the locking request or the unlocking request does not match the bicycle ID of the bicycle.

10. The method of claim 9, further comprising:

receiving the locking request by a server from a user terminal through a first communication link between the server and the user terminal.

11. The method of claim 10, wherein the first communication link is a long-distance communication link.

12. The method of claim 11, wherein the long-distance communication link comprises a telecommunications link or the Internet.

13. The method of claim 10, the locking the bicycle comprising:

sending, by the server, a locking instruction to the bicycle via the first communication link; and locking, by the bicycle, the bicycle through the lock mechanism, when receiving the locking instruction.

14. The method of claim 10, further comprising:

receiving the unlocking requesting by the server from the user terminal through the first communication link.

15. The method of claim 14, the unlocking the bicycle comprising:

sending, by the server, an unlocking instruction to the bicycle via the first communication link; and unlocking, by the bicycle, the bicycle through the lock mechanism when receiving the unlocking instruction.

16. A system for managing locking of a bicycle, comprising:

a bicycle, configured with a locking mechanism for locking and unlocking the bicycle; and a server configured to:
receive a locking request from a user of the bicycle, wherein the locking request includes a bicycle ID;

send a locking instruction to the bicycle to lock the bicycle;

receive an unlocking request from the user of the bicycle, wherein the unlocking request includes a bicycle ID, and send an unlocking instruction to the bicycle to perform unlock the vehicle, wherein the locking the bicycle and unlocking the bicycle do not require manual operation of the locking mechanism by the user, and wherein an alarm message is generated when the bicycle ID of the locking request or the unlocking request does not match the bicycle ID of the bicycle.

17. A bicycle, comprising:

a locking mechanism configured to lock and unlock the bicycle; and a controller configured to:
  receive a locking request,
  wherein the locking request includes a bicycle ID;
  control the locking mechanism to lock the bicycle, upon receiving the locking instruction;
  receive an unlocking instruction,
  wherein the unlocking request includes a bicycle ID; and
  control the locking mechanism to unlock the bicycle, upon receiving the unlocking instruction,
  wherein the locking the bicycle and unlocking the bicycle do not require manual operation of the locking mechanism by a user, and
  wherein an alarm message is generated when the bicycle ID of the locking request or the unlocking request does not match the bicycle ID of the bicycle.

\* \* \* \* \*